(12) United States Patent
Borge (10) Patent No.: US 10,641,046 B2
(45) Date of Patent: May 5, 2020

(54) CUTTING ELEMENTS WITH GEOMETRIES TO BETTER MAINTAIN AGGRESSIVENESS AND RELATED EARTH-BORING TOOLS AND METHODS

(71) Applicant: Baker Hughes, LLC, Houston, TX (US)

(72) Inventor: Richard Wayne Borge, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 255 days.

(21) Appl. No.: 15/861,057

(22) Filed: Jan. 3, 2018

(65) Prior Publication Data

US 2019/0203540 A1 Jul. 4, 2019

(51) Int. Cl.
*E21B 10/55* (2006.01)
*E21B 10/573* (2006.01)
(Continued)

(52) U.S. Cl.
CPC .............. *E21B 10/55* (2013.01); *B23P 15/28* (2013.01); *E21B 10/5673* (2013.01);
(Continued)

(58) Field of Classification Search
CPC .............. E21B 10/573; E21B 10/5673; E21B 10/5735; E21B 10/52; E21B 10/16;
(Continued)

(56) References Cited

U.S. PATENT DOCUMENTS 3,088,535 A * 5/1963 Rees Rees .............. E21B 10/58
175/420.1
4,109,737 A * 8/1978 Bovenkerk ......... E21B 10/5673
175/430
(Continued)

FOREIGN PATENT DOCUMENTS

EP 1592861 B1 4/2007
WO 2017/087920 A1 5/2017

OTHER PUBLICATIONS

International Written Opinion for International Application No. PCT/US2019/012044 dated Apr. 29, 2019, 7 pages.
(Continued)

*Primary Examiner* — Kipp C Wallace
(74) *Attorney, Agent, or Firm* — TraskBritt (57) ABSTRACT

Cutting elements for earth-boring tools may include a substrate and a polycrystalline, superhard material secured to an end of the substrate. A first, greatest diameter of the polycrystalline, superhard material may be greater than a second, greatest diameter of the substrate, as measured in a direction at least substantially parallel to a cutting face of the polycrystalline, superhard material. Methods of making cutting elements for earth-boring tools may involve securing a polycrystalline, superhard material to an end of a substrate. A first, greatest diameter of the polycrystalline, superhard material may be rendered greater than a second, greatest diameter of the substrate, as measured in a direction at least substantially parallel to a cutting face of the polycrystalline, superhard material.

20 Claims, 9 Drawing Sheets

(51) Int. Cl.
*E21B 10/567* (2006.01)
*B23P 15/28* (2006.01)
*E21B 10/60* (2006.01)
*B22F 5/00* (2006.01)

(52) U.S. Cl.
CPC ........ *E21B 10/5735* (2013.01); *E21B 10/602* (2013.01); *B22F 2005/001* (2013.01)

(58) Field of Classification Search
CPC .... E21B 10/55; E21B 10/567; E21B 10/5676; E21B 10/62; E21B 10/46; E21B 10/56; E21B 10/58; E21B 2010/562; B22F 2005/001
See application file for complete search history.

(56) References Cited

U.S. PATENT DOCUMENTS

| | | | | |
|---|---|---|---|---|
| 5,078,219 | A * | 1/1992 | Morrell | B28D 1/12 299/111 |
| 5,740,874 | A | 4/1998 | Matthias | |
| 5,881,830 | A | 3/1999 | Cooley | |
| 6,145,607 | A * | 11/2000 | Griffin | E21B 10/5735 175/426 |
| 6,283,234 | B1 * | 9/2001 | Torbet | E21B 10/573 175/413 |
| 6,302,224 | B1 * | 10/2001 | Sherwood, Jr. | E21B 10/573 175/397 |
| 6,367,568 | B2 | 4/2002 | Steinke et al. | |
| 7,730,977 | B2 | 6/2010 | Achilles | |
| 8,322,467 | B2 | 12/2012 | Shen et al. | |
| 8,689,911 | B2 | 4/2014 | Stowe, II et al. | |
| 8,783,387 | B2 | 7/2014 | Durairajan et al. | |
| 2005/0082093 | A1 | 4/2005 | Keshavan et al. | |
| 2006/0237236 | A1 * | 10/2006 | Sreshta | B22F 7/02 175/426 |
| 2006/0260846 | A1 * | 11/2006 | Portwood | E21B 10/16 175/331 |
| 2009/0114628 | A1 | 5/2009 | DiGiovanni | |
| 2009/0283328 | A1 * | 11/2009 | Drivdahl | E21B 10/567 175/58 |
| 2011/0174549 | A1 * | 7/2011 | Dolan | E21B 10/5673 175/428 |
| 2013/0255161 | A1 * | 10/2013 | Lin | E21B 10/5676 51/309 |
| 2013/0306377 | A1 | 11/2013 | DiGiovanni et al. | |
| 2014/0166371 | A1 | 6/2014 | Whittaker | |
| 2015/0047912 | A1 * | 2/2015 | Pettiet | E21B 10/43 175/428 |
| 2015/0259986 | A1 | 9/2015 | Stockey | |
| 2017/0175452 | A1 * | 6/2017 | Vempati | E21B 10/54 |
| 2018/0148978 | A1 * | 5/2018 | Chen | E21B 10/5673 |
| 2018/0313162 | A1 * | 11/2018 | Brady | E21B 10/36 |
| 2018/0334860 | A1 * | 11/2018 | Azar | E21B 10/42 |
| 2019/0071933 | A1 * | 3/2019 | Gan | E21B 10/55 |

OTHER PUBLICATIONS

International Search Report for International Application No. PCT/US2019/012044 dated Apr. 29, 2019, 5 pages.
Stockey et al,, U.S. Appl. No. 14/656,036, entitled Cutting Elements Configured to Mitigate Diamond Table Failure, Earth-Boring Tools Including Such Cutting Elements, and Related Methods, filed Mar. 12, 2015.

* cited by examiner

CUTTING ELEMENTS WITH GEOMETRIES TO BETTER MAINTAIN AGGRESSIVENESS AND RELATED EARTH-BORING TOOLS AND METHODS

FIELD

This disclosure relates generally to cutting elements for earth-boring tools, earth-boring tools including such cutting elements, and related methods. More specifically, disclosed embodiments relate to geometries for cutting elements that may better maintain aggressiveness of the cutting elements despite wear.

BACKGROUND

When an earth-boring tool is used to form or enlarge a borehole in an earth formation, cutting elements of the earth-boring tool may be driven into the earth material and the earth-boring tool may be rotated, enabling the cutting elements to form cuttings of and remove the earth material. The material or materials from which the cutting elements are made generally have high wear and impact resistance. The abrasive, corrosive, high-temperature, and high-pressure downhole environment, combined with the forces and impacts associated with earth boring, may nonetheless cause the materials of the cutting elements to wear away. For example, cutting elements may develop a flat spot proximate the cutting edges of the cutting elements, often referred to in the art as a "wear flat" or "wear scar." Cutting elements having flat spots may become dull, and may be less effective in removing the earth formation.

BRIEF SUMMARY

In some embodiments, cutting elements for earth-boring tools may include a substrate and a polycrystalline, superhard material secured to an end of the substrate. A first, greatest diameter of the polycrystalline, superhard material may be greater than a second, greatest diameter of the substrate, as measured in a direction at least substantially parallel to a cutting face of the polycrystalline, superhard material.

In other embodiments, earth-boring tools may include a body and at least one cutting element located in a corresponding pocket extending into the body. The at least one cutting element may include a substrate and a polycrystalline, superhard material secured to an end of the substrate. A first, greatest diameter of the polycrystalline, superhard material may be greater than a second, greatest diameter of the substrate, as measured in a direction at least substantially parallel to a cutting face of the polycrystalline, superhard material. The first, greatest diameter of the polycrystalline, superhard material may be greater than a third, greatest diameter of the pocket, as measured in the direction at least substantially parallel to the cutting face of the polycrystalline, superhard material.

In still other embodiments, methods of making cutting elements for earth-boring tools may involve securing a polycrystalline, superhard material to an end of a substrate. A first, greatest diameter of the polycrystalline, superhard material may be rendered greater than a second, greatest diameter of the substrate, as measured in a direction at least substantially parallel to a cutting face of the polycrystalline, superhard material.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The illustrations presented in this disclosure are not meant to be actual views of any particular cutting element, earth-boring tool, or component thereof, but are merely idealized representations employed to describe illustrative embodiments. Thus, the drawings are not necessarily to scale.

Disclosed embodiments relate generally to geometries for cutting elements that may better maintain aggressiveness of the cutting elements despite wear and may exhibit reduced wear rates. More specifically, disclosed are embodiments of geometries for cutting elements that may include polycrystalline, superabrasive materials.

As used in this specification, the terms "substantially" and "about" in reference to a given parameter, property, or condition means and includes to a degree that one skilled in the art would understand that the given parameter, property, or condition is met with a small degree of variance, such as within acceptable manufacturing tolerances. For example, a parameter that is substantially or about a specified value or condition may be at least about 90% the specified value or condition, at least about 95% the specified value or condition, or even at least about 99% the specified value or condition.

The term "earth-boring tool," as used herein, means and includes any type of bit or tool used for drilling during the formation or enlargement of a wellbore in a subterranean formation. For example, earth-boring tools include fixed-cutter bits, core bits, eccentric bits, bicenter bits, reamers, mills, hybrid bits including both fixed and rotatable cutting structures, and other drilling bits and tools known in the art.

As used herein, the term "superhard material" means and includes any material having a Knoop hardness value of about 3,000 $Kg_f/mm^2$ (29,420 MPa) or more. Superhard materials include, for example, diamond and cubic boron nitride. Superhard materials may also be characterized as "superabrasive" materials.

As used herein, the term "polycrystalline material" means and includes any structure comprising a plurality of grains (i.e., crystals) of material that are bonded directly together by inter-granular bonds. The crystal structures of the individual grains of the material may be randomly oriented in space within the polycrystalline material.

As used herein, the terms "inter-granular bond" and "inter-bonded" mean and include any direct atomic bond (e.g., covalent, metallic, etc.) between atoms in adjacent grains of superabrasive material.

As used herein, the term "tungsten carbide" means any material composition that contains chemical compounds of tungsten and carbon, such as, for example, WC, $W_2C$, and combinations of WC and $W_2C$. Tungsten carbide includes, for example, cast tungsten carbide, sintered tungsten carbide, and macrocrystalline tungsten carbide.

Figure 1:
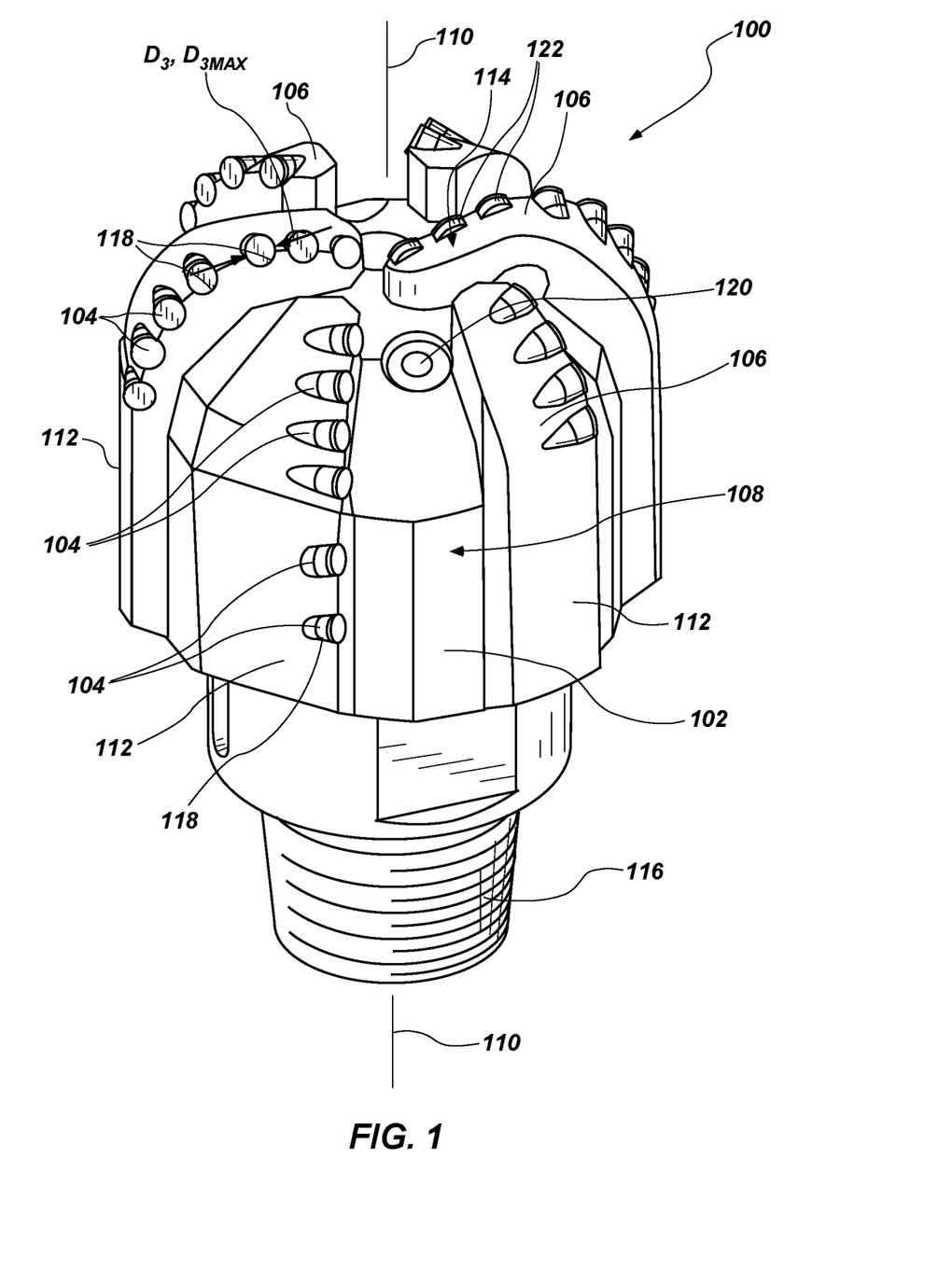
FIG. 1 is a perspective side view of an earth-boring tool.

FIG. 1 is a perspective side view of an earth-boring tool 100. The earth-boring tool 100 may include a body 102 having at least one cutting element 104 secured thereto. The earth-boring tool 100 depicted in FIG. 1 is configured as a bladed, rotary drill bit having cutting elements 104 secured to the blades thereof, but other configurations for earth-boring tools may be employed with cutting elements 104 in accordance with this disclosure. The body 102 of the earth-boring tool 100 may include, for example, blades 106 extending outward from a remainder of the body 102, with junk slots 118 located rotationally between the blades 106. The blades 106 may extend radially outward from proximate to an axis of rotation 110 of the earth-boring tool 100 to a gage region 112 at an outer diameter of the body 102. The blades 106 may extend longitudinally from a face 114 of the body 102 at a leading end of the earth-boring tool 100, toward a shank 116 at a trailing end of the earth-boring tool 100. The shank 116 may have a threaded connection portion, which may conform to industry standards (e.g., those promulgated by the American Petroleum Institute (API)), for attaching the earth-boring tool 100 to a drill string. The body 102 may include one or more materials suitable for downhole use. For example, the body 102 may include a metal or metal alloy material (e.g., steel) or a particle-matrix composite material (e.g., particles of tungsten carbide located in a metal or metal alloy matrix).

Cutting elements 104 may be secured at least partially within pockets 118 extending into the body 102, such as, for example, from rotationally leading surfaces of a blade 106 into the blade 106. The cutting elements 104 may be secured to one, some, or all of the blades 106 of a given earth-boring tool 100. The cutting elements 104 may be configured to be driven into, and remove, an underlying earth material during rotation of the earth-boring tool 100 under an applied load (e.g., weight-on-bit). Nozzles 120 located within the junk slots 108 may emit drilling fluid circulating through the drill string under pressure to remove cuttings from the cutting elements 104 and any other cutting elements and carry the cuttings suspended in the drilling fluid to the surface.

Figure 2:
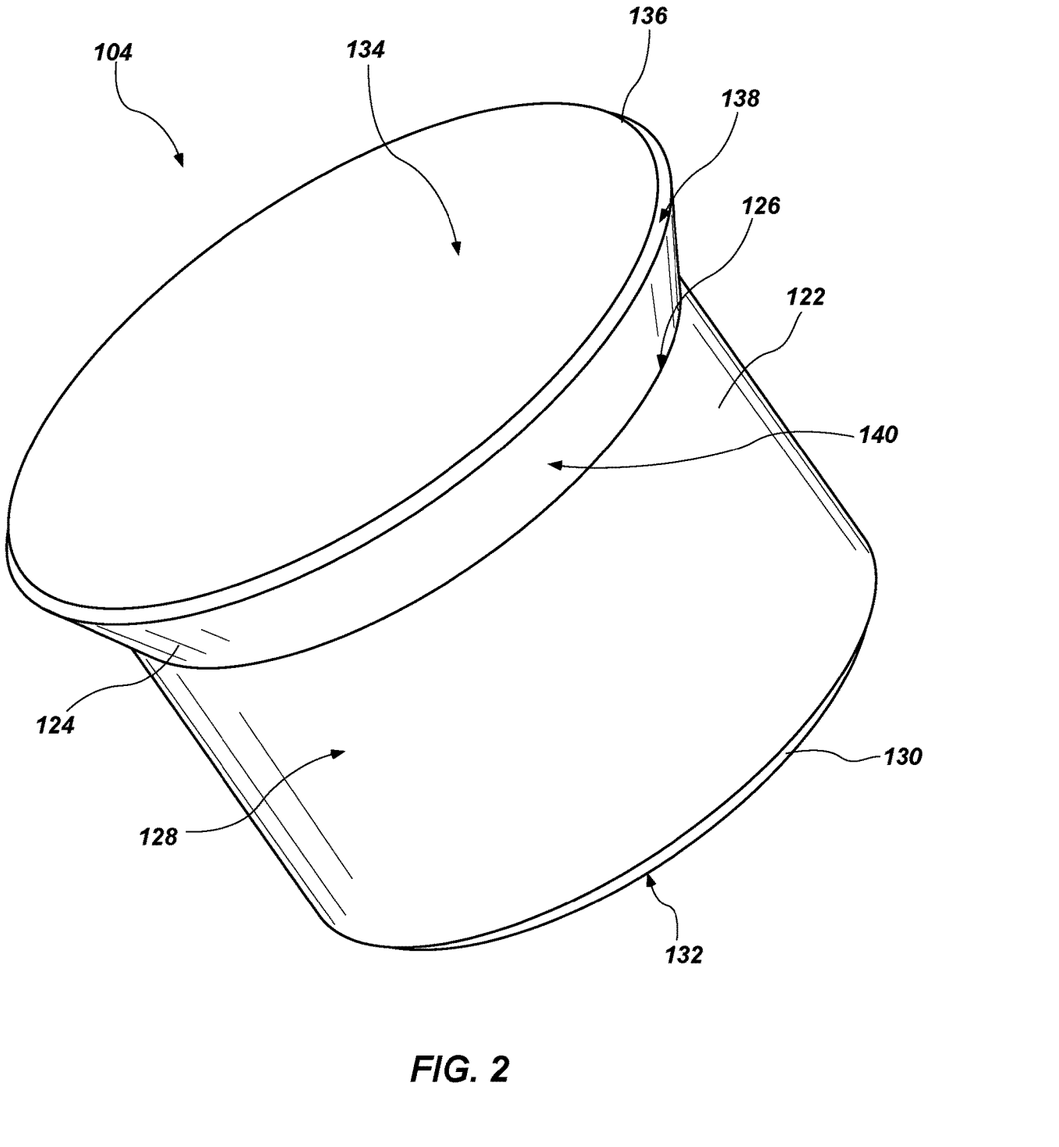
FIG. 2 is a perspective side view of a cutting element of the earth-boring tool of FIG. 1.

FIG. 2 is a perspective side view of a cutting element 104 of the earth-boring tool 100 of FIG. 1. The cutting element 104 may include a substrate 122 and a polycrystalline, superhard material 124 secured to an end 126 of the substrate 122. The substrate 122 may be generally cylindrical in shape. For example, the substrate 122 may include a curved side surface 128 extending radially around a lateral periphery of the substrate. The curved side surface 128 may extend longitudinally from the polycrystalline, superhard material 124 away from a cutting face 134 thereof. As a result, the curved side surface 128 may have an at least substantially circular cross-section. An optional chamfer 130 may extend from the side surface 128 to another end 132 of the substrate 122 located opposite the polycrystalline, superhard material 124. In some embodiments, the end 126 of the substrate 122 on which the polycrystalline, superhard material 124 is located may include a nonplanar interface design. The substrate 122 may include one or more materials suitable for downhole use. For example, the substrate 122 may include a metal or metal alloy material (e.g., steel) or a particle-matrix composite material (e.g., particles of tungsten carbide located in a metal or metal alloy matrix). As a specific, nonlimiting example, the substrate 122 may include particles of tungsten carbide bound in a metal alloy matrix including one or more Group VIII-A metals (e.g., iron, cobalt, nickel).

The polycrystalline, superhard material 124 may include a cutting face 134 located on a side of the polycrystalline, superhard material 124 opposite the substrate 122. A cutting edge 136 may be located at a periphery of the cutting face 134. A surface 138 of the polycrystalline, superhard material 124 extending from the cutting face 134 toward a first, greatest diameter $D_{1MAX}$ of the polycrystalline, superhard material may be tapered. For example, the surface 138 may be chamfered, the chamfered surface 138 extending from the cutting face 134 radially outward to the first, greatest diameter $D_{1MAX}$ of the polycrystalline, superhard material 124 and longitudinally toward the substrate 122. The polycrystalline, superhard material 124 may further include at least one tapered surface 140 extending from the first, greatest diameter $D_{MAX}$ toward the substrate 122, such that the first, greatest diameter $D_{1MAX}$ may be at an edge formed by an intersection of the chamfered surface 138 and the tapered surface 140, or a first of the tapered surfaces 140. Although a specific geometry for the polycrystalline, superhard material 124 has been shown and described in connection with FIG. 1, polycrystalline, superhard materials having various other geometries, such as, for example, those shown and described in connection with FIGS. 4 through 8, may be employed to produce cutting elements 104 in accordance with this disclosure.

Figure 3:
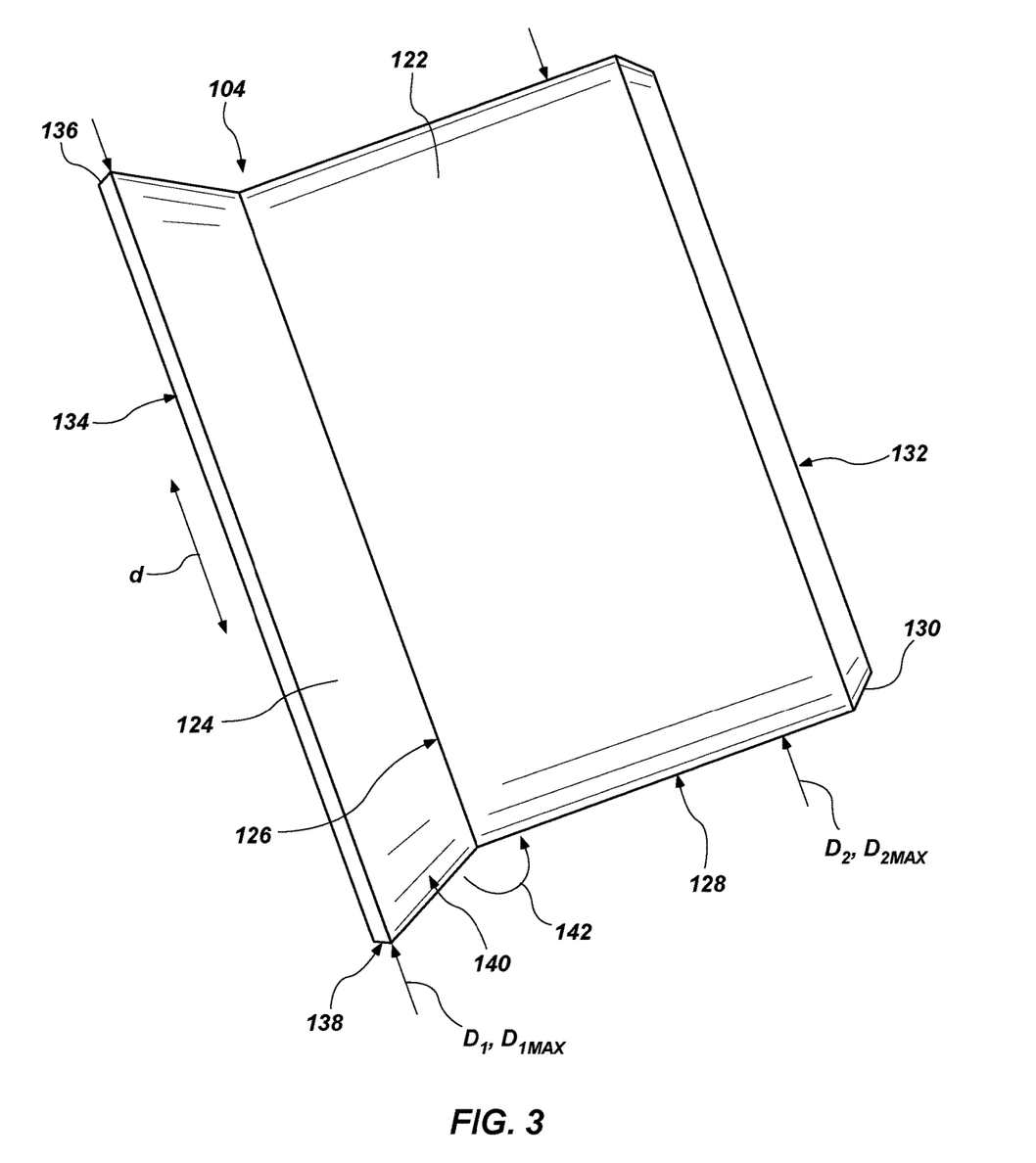
FIG. 3 is a side view of the cutting element of FIG. 2.

FIG. 3 is a side view of the cutting element 104 of FIG. 2. At least a portion of the polycrystalline, superhard material 124 may extend laterally beyond the side surface 128 of the substrate 122. For example, a first, greatest diameter $D_{1MAX}$ of the polycrystalline, superhard material 124 may be greater than a second, greatest diameter $D_{2MAX}$ of the substrate 122, as measured in a direction d at least substantially parallel to the cutting face 134 of the polycrystalline, superhard material 124. More specifically, the first, greatest diameter $D_{1MAX}$ may be, for example, between about 105% and about 150% the second, greatest diameter $D_{2MAX}$. As a specific, nonlimiting example, the first, greatest diameter $D_{1MAX}$ may be between about 110% and about 125% the second, greatest diameter $D_{2MAX}$. In some embodiments, such as that shown in FIG. 3, a first diameter $D_1$ of the polycrystalline, superhard material 124 may be greater than a second diameter $D_2$ of the substrate 122, as measured in the direction d at least substantially parallel with the cutting face 134 of the polycrystalline, superhard material 124, for an entire circumference of each of the polycrystalline, superhard material 124 and the substrate 122.

Returning to FIG. 1, the first, greatest diameter $D_{1MAX}$ of the polycrystalline, superhard material 124 may be greater than a third, greatest diameter $D_{3MAX}$ of the pocket 118 in which at least a portion of the substrate 122 of the cutting element 104 may be secured, as measured in the direction at least substantially parallel to the cutting face 134 of the polycrystalline, superhard material 124. As a result, the cutting elements 104 with radially enlarged polycrystalline, superhard materials 124 may be used with a wide variety of earth-boring tools 100 without requiring specialized shapes or sizes for the pockets 118. Indeed, earth-boring tools 100 may be retrofit with cutting elements 104 in accordance with this disclosure by removing conventional cutting elements previously located in the pockets 118 and subsequently securing cutting elements 104 in accordance with this disclosure partially within the pockets 118 (e.g., by brazing).

As shown in FIG. 3, an angle 142 between the side surface 128 of the substrate 122 and the tapered surface 140 of the polycrystalline, superhard material 124 may be, for example, between about 5° and about 45°. More specifically, the included angle 142 between the side surface 128 of the substrate 122 and the tapered surface 140 of the polycrystalline, superhard material 124 may be, for example, between about 10° and about 45°. As a specific, nonlimiting example, the angle 142 between the side surface 128 of the substrate 122 and the tapered surface 140 of the polycrystalline, superhard material 124 may be, for example, between about 15° and about 45°.

Figure 4:
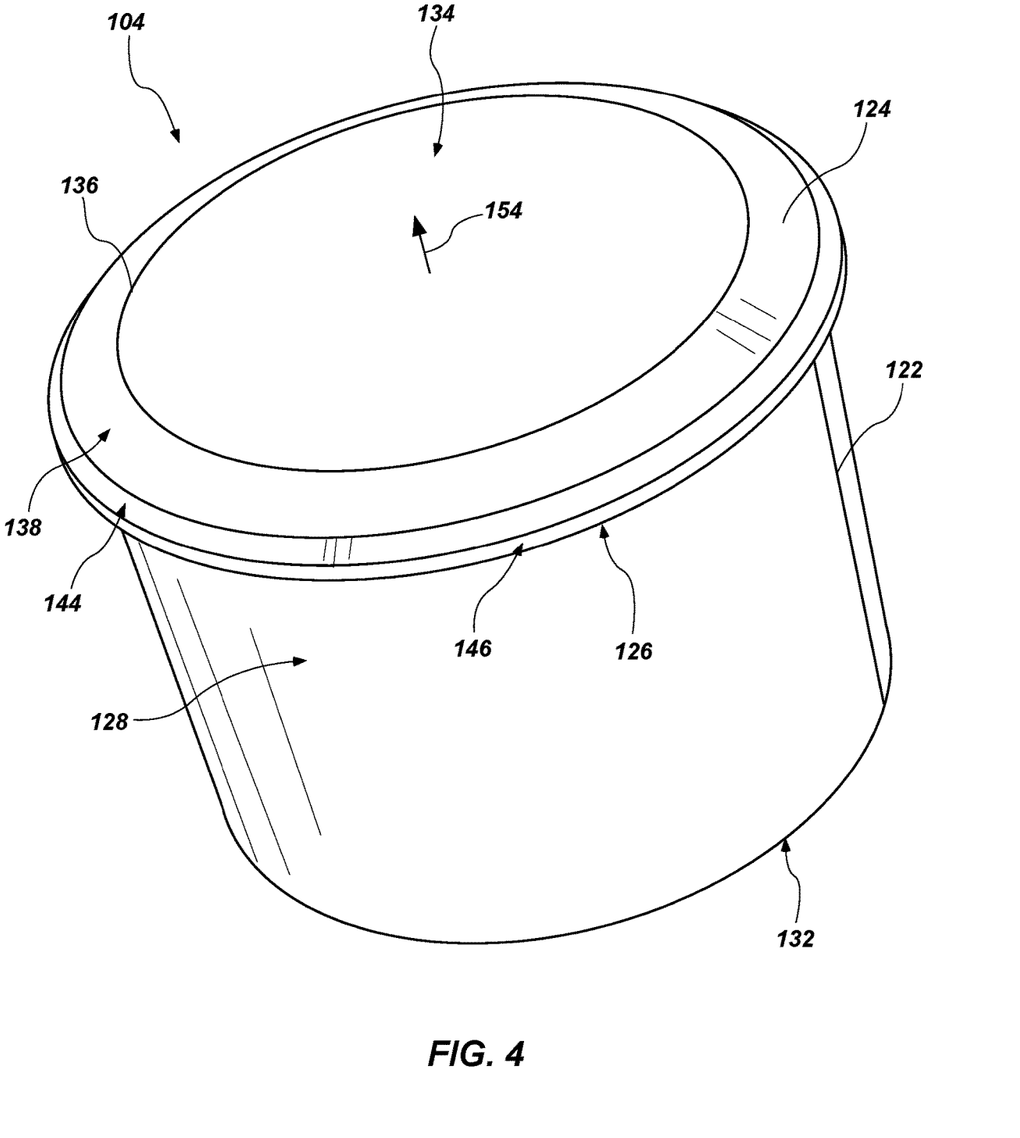
FIG. 4 is a perspective side view of another embodiment of a cutting element of the earth-boring tool of FIG. 1.

FIG. 4 is a perspective side view of another embodiment of a cutting element 104 of the earth-boring tool 100 of FIG. 1. The polycrystalline, superhard material 124 shown in FIG. 4 may include at least two chamfers, the first chamfered surface 138 extending directly from the cutting face 134 radially outward and longitudinally toward the substrate 122 and a second chamfered surface 144 extending radially outward directly from the first, chamfered surface 138 and longitudinally toward the substrate 122.

Figure 5:
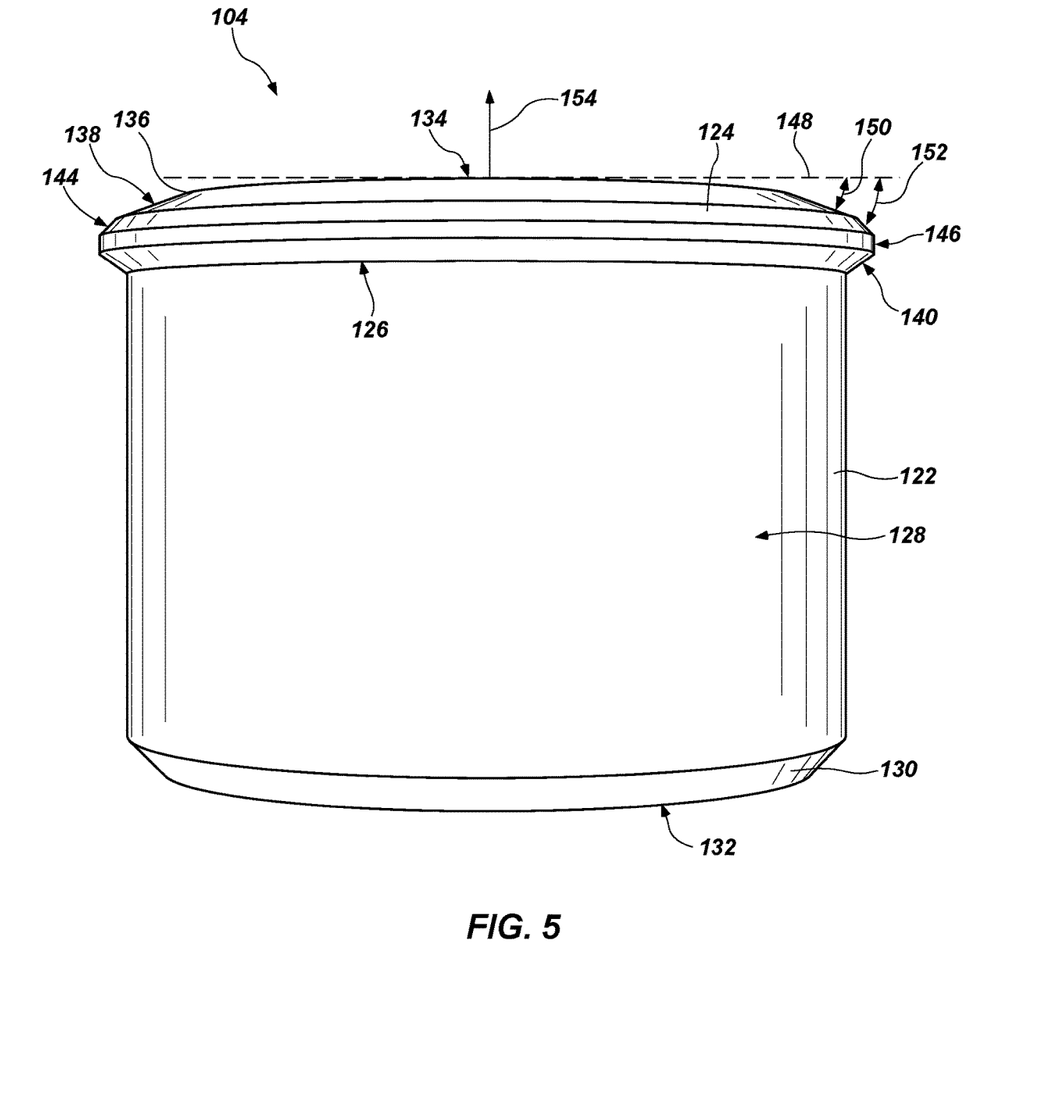
FIG. 5 is a side view of the cutting element of FIG. 4.

FIG. 5 is a side view of the cutting element 104 of FIG. 4. The first chamfered surface 138 may extend longitudinally at a shallower angle than the second chamfered surface 144 relative to the cutting face 134. For example, a first included angle 150 formed between a plane 148 coplanar with the cutting face 134 and the first chamfered surface 138 may be between about 5° and about 45°, and a second included angle 152 formed between the plane 148 and the second chamfered surface 144 may be greater than the first included angle 150 and may be between about 15° and about 80°. More specifically, the first included angle 150 may be between about 15° and about 35°, and the second included angle 152 may be greater than the first included angle 150 and may be between about 35° and about 65°.

In some embodiments, such as that shown in FIGS. 4 and 5, another surface 146 of the polycrystalline, superhard material 124 located between the cutting face 134 and the substrate 122 may extend at least substantially parallel to the side surface 128 of the substrate 122. For example, the second chamfered surface 144 may extend radially outward to an at least substantially cylindrical side surface 146, which may extend longitudinally in a direction at least substantially parallel to the side surface 128 of the substrate 122. More specifically, a line 154 extending perpendicular to the cutting face 134 may be parallel to the side surfaces 128 and 146 of the substrate 122 and the polycrystalline, superhard material 124.

At least a portion of the tapered surface 140 extending from the first, greatest outer diameter $D_{1MAX}$ of the polycrystalline, superhard material 124 toward the substrate 122 may be of at least substantially constant slope in some embodiments. For example, the tapered surface 140 may be at least substantially frustoconical in shape, as shown in FIG. 5.

Figure 6:
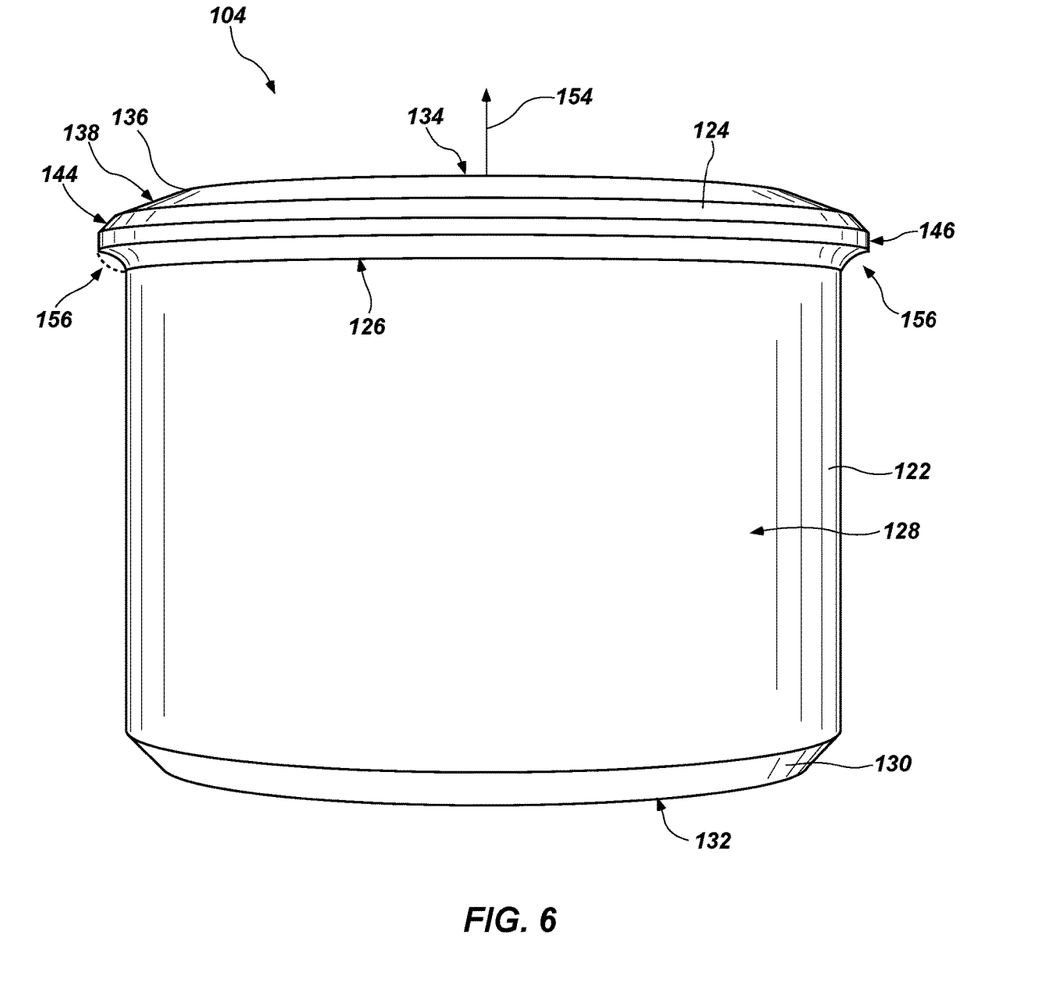
FIG. 6 is a side view of yet another embodiment of a cutting element of the earth-boring tool of FIG. 1.

FIG. 6 is a side view of yet another embodiment of a cutting element 104 of the earth-boring tool 100 of FIG. 1. At least a portion of a surface 156 of the polycrystalline, superhard material 124 extending from the first, greatest outer diameter $D_{1MAX}$ of the polycrystalline, superhard material 124 toward the substrate 122 may be curved in some embodiments. For example, a slope of the curved surface 156 relative to the side surface 128 of the substrate 122 may vary at least substantially continuously with longitudinal distance from the cutting face 134. A curvature of the curved surface 156 may be, for example, concave, as shown in solid lines, or convex, as shown in dashed lines.

Although FIGS. 5 and 6 depict a single tapered surface 140 or curved surface 156 extending from the first, greatest outer diameter $D_{1MAX}$ of the polycrystalline, superhard material 124 toward the substrate 122, cutting elements 104 in accordance with this disclosure may include multiple tapered surfaces 140, curved surfaces 156, or combinations of tapered surfaces 140 and curved surfaces 156 in the sloping transition from the first, greatest outer diameter $D_{1MAX}$ of the polycrystalline, superhard material 124 toward the substrate 122. For example, cutting elements 104 in accordance with this disclosure may include a frustoconical, tapered surface 140 followed by a curved surface 156, a convex curved surface 156 followed by a concave curved surface, two frustoconical, tapered surfaces 140 extending at different slopes with a curved surface 156 between the tapered surface 140, or any combination or subcombination of such surfaces.

Figure 7:
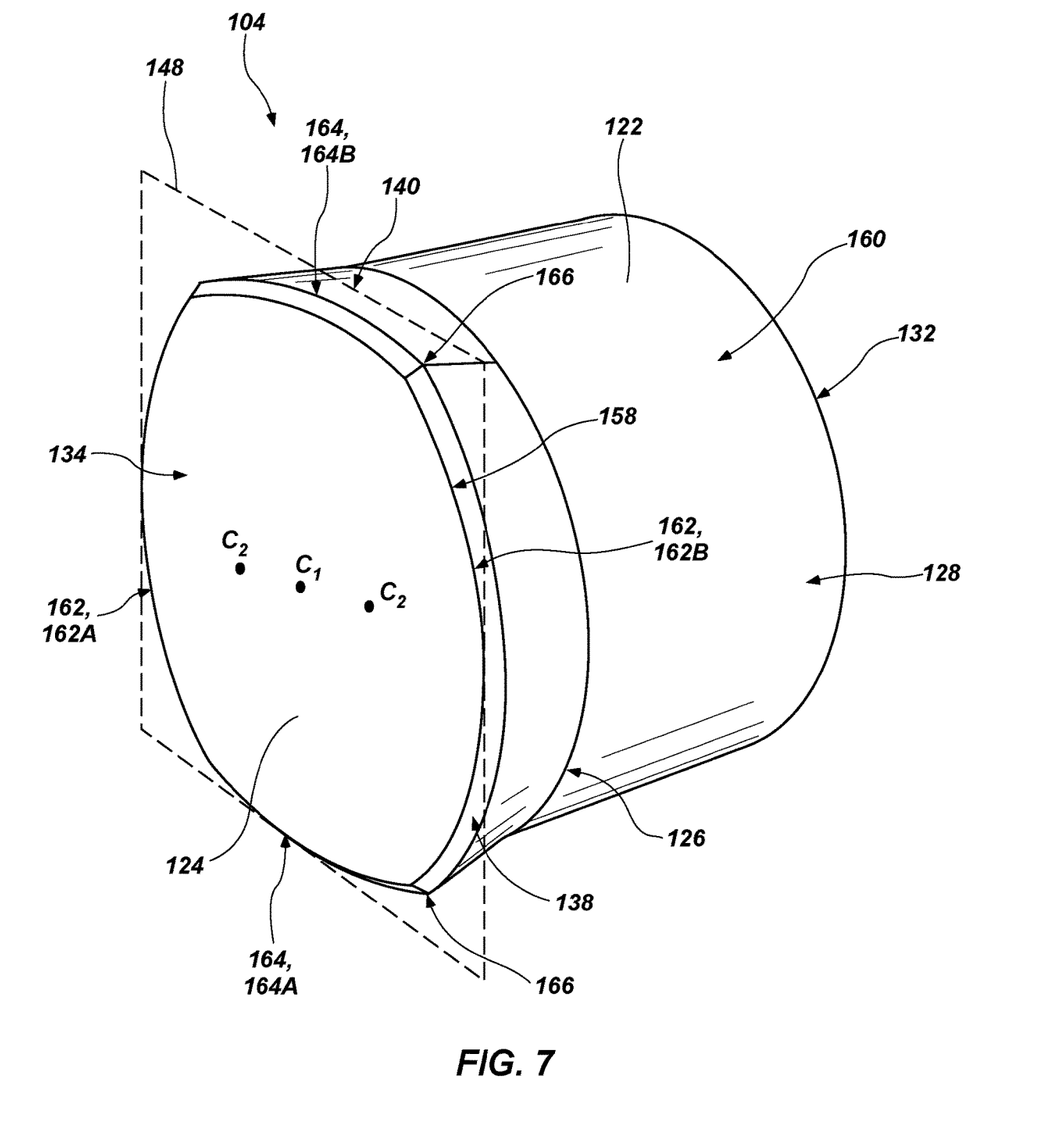
FIG. 7 is a perspective side view of still another embodiment of a cutting element of the earth-boring tool of FIG. 1.

FIG. 7 is a perspective side view of still another embodiment of a cutting element 104 of the earth-boring tool 100 of FIG. 1. A first center of curvature $C_1$ of at least a portion of a first lateral perimeter 158 of the polycrystalline, superhard material 124 may be offset from a second center of curvature $C_2$ of a second lateral perimeter 160 of the substrate 122. The first lateral perimeter 158 of the polycrystalline, superhard material 124 may include multiple portions, such as, for example, a first portion 162 having the first center of curvature $C_1$ and a second portion 164 having the same, second center of curvature $C_2$ as the second lateral perimeter 160 of the substrate 122. More specifically, the first lateral perimeter 158 of the polycrystalline, superhard material 124 may include, for example, four segments when viewed in the plane 148 coplanar with the cutting face 134, two of which may form the first portion 162 and another two of which may form the second portion 164. As a specific, nonlimiting example, the first lateral perimeter 158 of the polycrystalline, superhard material 124 may include two segments 162A and 162B which may be located on opposing lateral sides of the first lateral perimeter 158 and may have a larger radius of curvature that places their centers of curvature $C_1$ offset from the second center of curvature $C_2$ of the second lateral perimeter 160 of the substrate 122. Continuing the specific, nonlimiting example, the first lateral perimeter 158 of the polycrystalline, superhard material 124 may include another two segments 164A and 164B which may be located on formation-facing and chip-breaking sides of the first lateral perimeter 158 and may have a smaller radius of curvature that places their centers of curvature $C_2$ at the same point as the second center of curvature $C_2$ of the second lateral perimeter 160 of the substrate 122. In other words, the first two segments 162A and 162B may not form portions of a concentric circle around the substrate 122, whereas the second two segments 164A and 164B may form portions of a concentric circle around the substrate 122. The first two segments 162A and 162B may intersect with the second two segments 164A and 164B at corners 166, such that the first lateral perimeter 158 of the polycrystalline, superhard material 124 may resemble a rectangle with curving, bowed out sides when viewed in a direction perpendicular to the cutting face 134.

Figure 8:
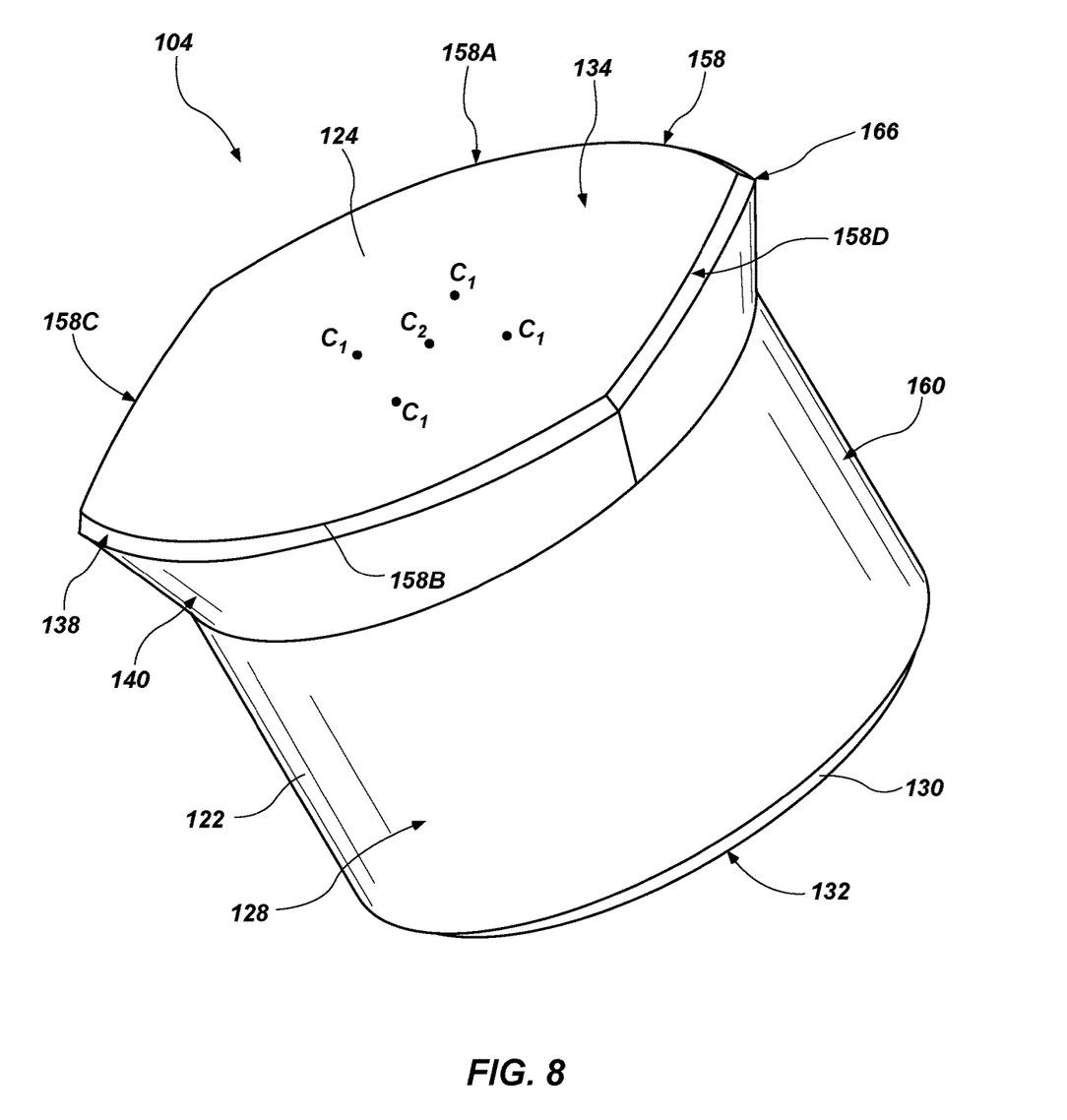
FIG. 8 is a perspective side view of yet another embodiment of a cutting element of the earth-boring tool of FIG. 1.

FIG. 8 is a perspective side view of yet another embodiment of a cutting element 104 of the earth-boring tool 100 of FIG. 1. The first center of curvature $C_1$ of an entirety of the first lateral perimeter 158 of the polycrystalline, superhard material 124 may be offset from the second center of curvature $C_2$ of a second lateral perimeter 160 of the substrate 122. The first lateral perimeter 158 of the polycrystalline, superhard material 124 may still include multiple segments, such as, for example, two segments 158A and 158B which may be located on opposing lateral sides of the first lateral perimeter 158 and another two segments 158C and 158D which may be located on formation-facing and chip-breaking sides of the first lateral perimeter 158, each of which may have larger, at least substantially equally sized radii of curvature than a concentric circle around the second lateral perimeter 160 of the substrate 122, placing their centers of curvature $C_1$ offset from the center of curvature $C_2$ of the substrate 122. In other words, none of the segments 158A, 158B, 158C, and 158D may form portions of a concentric circle around the substrate 122. The segments 158A, 158B, 158C, and 158D may intersect with one another at corners 166, such that the first lateral perimeter 158 of the polycrystalline, superhard material 124 may resemble a square with curving, bowed out sides when viewed in a direction perpendicular to the cutting face 134.

Although specific geometries for the polycrystalline, superhard material 124 have been shown and described in connection with FIGS. 2 through 8, polycrystalline, superhard materials having various other geometries, such as, for example, combinations and subcombinations of the various features of the polycrystalline, superhard materials 124 shown in FIGS. 2 through 8, may be employed to produce cutting elements 104 in accordance with this disclosure. For example, the first, maximum diameter $D_{1MAX}$ may be located at an edge or a surface 146, the polycrystalline, superhard material 124 may include no chamfer, one chamfer 138, or two chamfers 138 and 144, a planar surface, tapered surface 140, or curved surface 156 extending from the first, maximum diameter $D_{1MAX}$ toward the substrate 122, or any combination or subcombination of these features.

Cutting elements 104 in accordance with this disclosure may be formed by additive or subtractive manufacturing techniques. For example, the cutting element 104 may be made by forming the polycrystalline, superhard material 124 as a disc and the substrate 122 as a cylinder, both at the first, greatest diameter $D_{1MAX}$. Portions of the polycrystalline, superhard material 124 may be removed to form features, such as, for example, the chamfer 138 or chamfers 138 and 144, the tapered surface 140, and the curved surface 156. The diameter of the substrate 122 may be reduced by removing material of the substrate 122 from the periphery thereof until the substrate 122 exhibits the second, greatest diameter $D_{2MAX}$. As a result, formation of the cutting element 104 may involve removing at least a portion of the polycrystalline, superhard material 124, the material of the substrate 122, or both the polycrystalline, superhard material 124 and the material of the substrate 122. As another example, the cutting element 104 may be made by forming the polycrystalline, superhard material 124 with all its features. For example, a precursor for the polycrystalline, superhard material 124 (e.g., particles of the superhard material with an optional, powdered catalyst material) may be placed in a container that may then be surrounded by a pressure-transmitting material (e.g., alumina sand), in at least substantially the same shape as an intended final shape for the polycrystalline, superhard material 124. The precursor material may then be sintered, such as, for example, under high-pressure, high-temperature conditions to form the polycrystalline, superhard material with all its intended features. The substrate 122 may be formed from another precursor material (e.g., tungsten carbide particles and a powdered metal or metal alloy matrix material) positioned in the container and pressure-transmitting material, and sintered to form the substrate 122 at the second, greatest diameter $D_{2MAX}$. Alternatively, a preformed substrate 122 may be placed in the container and pressure-transmitting material, and subjected to the sintering conditions to secure the polycrystalline, superhard material 124 to the end 126 of the substrate 122. As still another alternative, the polycrystalline, superhard material 124 may be formed separately from the substrate 122, and the preformed polycrystalline, superhard material 124 may subsequently be attached to the substrate 122 (e.g., through sintering, brazing, etc.).

Rendering at least a portion of the first diameter $D_1$ of the polycrystalline, superhard material 124 greater than the second diameter $D_2$ of the substrate 122 may increase a length of the cutting edge 136 per area of a wear scar forming on the cutting element 104 as a function of a depth of the wear scar. As a result, a rate at which wear occurs, and the wear scar grows, may be reduced. In addition, an aggressiveness of the cutting element 104 (e.g., as measured in terms of an amount of energy required per unit of distance advanced into the earth formation) may remain at least substantially equal to an unworn aggressiveness of the cutting element 104. The rate at which the aggressiveness of the cutting element 104 decreases as a result of dulling and growth of the wear scar may also be reduced. Finally, concerns about the impact resistance of the portions of the polycrystalline, superhard material 124 extending radially beyond the substrate 122 may be addressed by selecting the back and side rake angles of a given cutting element 104 to direct an effective force acting on such portions through the interior of the polycrystalline, superhard material 122 into the substrate. At larger differences between the first, greatest diameter $D_{1MAX}$ of the polycrystalline, superhard material 124 and the second, greatest diameter $D_{2MAX}$ of the substrate 122, there may be tradeoffs between the improvements flowing from increasing cutting edge 136 length per wear scar area and potential reductions in impact resistance.

Figure 9:
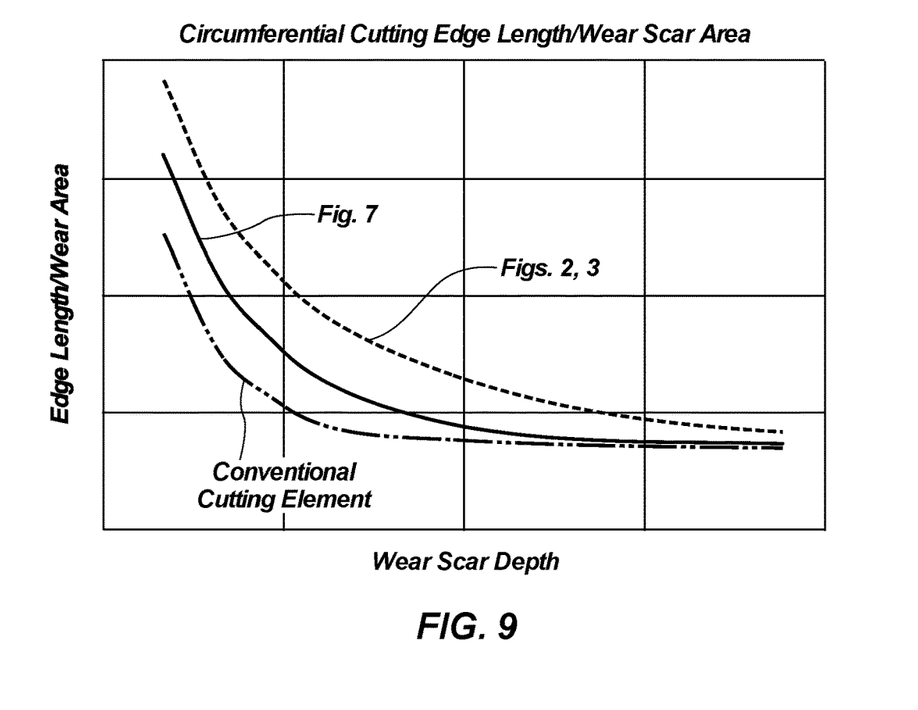
FIG. 9 is a graph of a length of a cutting edge per wear scar area plotted against wear scar depth for a conventional cutting element and two embodiments of cutting elements in accordance with this disclosure.

FIG. 9 is a graph of a length of a cutting edge 136 (see FIG. 2) per wear scar area plotted against wear scar depth for a conventional cutting element and two embodiments of cutting elements 104 (see FIGS. 2, 3, 7) in accordance with this disclosure. As shown in FIG. 9, the length of the cutting edge 136 (see FIG. 2) per wear scar area of the cutting elements 104 (see FIGS. 2, 3, 7) in accordance with this disclosure may be greater than the length of the cutting edge per wear scar area of the conventional cutting element at all measured wear scar depths. In particular, the length of the cutting edge 136 (see FIG. 2) per wear scar area of the cutting elements 104 (see FIGS. 2, 3, 7) in accordance with this disclosure may be particularly increased relative to that of the conventional cutting element at relatively small and medium-sized wear scar depths.

Figure 10:
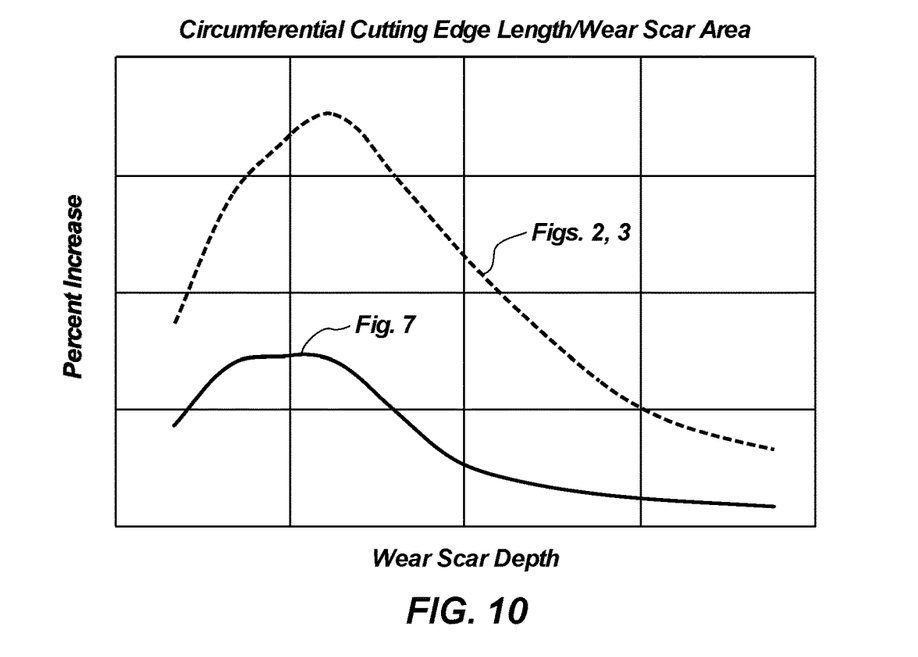
FIG. 10 is a graph of a percent increase in length of a cutting edge per wear scar area plotted against wear scar depth for two embodiments of cutting elements in accordance with this disclosure.

FIG. 10 is a graph of a percent increase in length of a cutting edge 136 (see FIG. 2) per wear scar area plotted against wear scar depth for two embodiments of cutting elements 104 (see FIGS. 2, 3, 7) in accordance with this disclosure. As shown in FIG. 10, the percent increase in length of the cutting edge 136 (see FIG. 2) per wear scar area of the cutting elements 104 (see FIGS. 2, 3, 7) in accordance with this disclosure may be positive at all measured wear scar depths. In particular, the percent increase in length of the cutting edge 136 (see FIG. 2) per wear scar area of the cutting elements 104 (see FIGS. 2, 3, 7) in accordance with this disclosure may be particularly great at relatively small and medium-sized wear scar depths.

Additional, nonlimiting embodiments within the scope of this disclosure include the following:

Embodiment 1: A cutting element for an earth-boring tool, comprising: a substrate; and a polycrystalline, superhard material secured to an end of the substrate; wherein a first, greatest diameter of the polycrystalline, superhard material is greater than a second, greatest diameter of the substrate, as measured in a direction at least substantially parallel to a cutting face of the polycrystalline, superhard material.

Embodiment 2: The cutting element of Embodiment 1, wherein a first diameter of the polycrystalline, superhard material is greater than a second diameter of the substrate, as measured in the direction at least substantially parallel with the cutting face of the polycrystalline, superhard material, for an entire circumference of each of the polycrystalline, superhard material and the substrate.

Embodiment 3: The cutting element of Embodiment 1 or Embodiment 2, wherein the first, greatest diameter is between about 105% and about 150% the second, greatest diameter.

Embodiment 4: The cutting element of any one of Embodiments 1 through 3, wherein a surface of the polycrystalline, superhard material extending from the first, greatest diameter of the polycrystalline, superhard material toward the substrate is tapered.

Embodiment 5: The cutting element of Embodiment 4, wherein another surface of the polycrystalline, superhard material located between the cutting face and the substrate is at least substantially parallel to a side surface of the substrate extending from the polycrystalline, superhard material away from the cutting face.

Embodiment 6: The cutting element of Embodiment 4 or Embodiment 5, wherein the surface of the polycrystalline, superhard material extending from the first, greatest diameter of the polycrystalline, superhard material toward the substrate is curved.

Embodiment 7: The cutting element of Embodiment 6, wherein the surface of the polycrystalline, superhard material extending from the first, greatest diameter of the polycrystalline, superhard material toward the substrate is convex or concave.

Embodiment 8: The cutting element of Embodiment 4 or Embodiment 5, wherein an angle between a side surface of the substrate extending from the polycrystalline, superhard material away from the cutting face and the surface of the polycrystalline, superhard material extending from the first, greatest diameter of the polycrystalline, superhard material toward the substrate is between about 5° and about 45°.

Embodiment 9: The cutting element of any one of Embodiments 1 through 8, wherein a surface of the polycrystalline, superhard material extending from the cutting face to the first, greatest diameter of the polycrystalline, superhard material is tapered.

Embodiment 10: The cutting element of any one of Embodiments 1 through 9, wherein a first center of curvature of at least a portion of a first lateral perimeter of the polycrystalline, superhard material is offset from a second center of curvature of a second lateral perimeter of the substrate.

Embodiment 11: The cutting element of Embodiment 10, wherein a first portion of the first lateral perimeter is concentric with the second lateral perimeter and a second portion of the first lateral perimeter is not concentric with the second lateral perimeter.

Embodiment 12: The cutting element of Embodiment 10, wherein the first center of curvature of an entirety of the first lateral perimeter of the polycrystalline, superhard material is offset from the second center of curvature of the second lateral perimeter of the substrate.

Embodiment 13: An earth-boring tool, comprising: a body; and at least one cutting element located in a corresponding pocket extending into the body, the at least one cutting element comprising: a substrate; and a polycrystalline, superhard material secured to an end of the substrate; wherein a first, greatest diameter of the polycrystalline, superhard material is greater than a second, greatest diameter of the substrate, as measured in a direction at least substantially parallel to a cutting face of the polycrystalline, superhard material; and wherein the first, greatest diameter of the polycrystalline, superhard material is greater than a third, greatest diameter of the pocket, as measured in the direction at least substantially parallel to the cutting face of the polycrystalline, superhard material.

Embodiment 14: A method of making a cutting element for an earth-boring tool, comprising: securing a polycrystalline, superhard material to an end of a substrate; and rendering a first, greatest diameter of the polycrystalline, superhard material greater than a second, greatest diameter of the substrate, as measured in a direction at least substantially parallel to a cutting face of the polycrystalline, superhard material.

Embodiment 15: The method of Embodiment 14, wherein rendering the first, greatest diameter of the polycrystalline, superhard material greater than the second, greatest diameter of the substrate comprises removing at least a portion of the polycrystalline, superhard material, a material of the substrate, or the polycrystalline, superhard material and the material of the substrate.

Embodiment 16: The method of Embodiment 14, wherein rendering the first, greatest diameter of the polycrystalline, superhard material greater than the second, greatest diameter of the substrate comprises forming the polycrystalline, superhard material with the first, greatest diameter and the substrate with the second, greatest diameter.

Embodiment 17: The method of any one of Embodiments 14 through 16, further comprising tapering a surface of the polycrystalline, superhard material from the first, greatest diameter of the polycrystalline, superhard material toward the substrate.

Embodiment 18: The method of Embodiment 17, wherein tapering the surface comprises rendering the surface of the polycrystalline, superhard material extending from the first, greatest diameter of the polycrystalline, superhard material toward the substrate curved.

Embodiment 19: The method of Embodiment 17, wherein tapering the surface comprises rendering an angle between a side surface of the substrate extending from the polycrystalline, superhard material away from the cutting face and the surface of the polycrystalline, superhard material extending from the first, greatest diameter of the polycrystalline, superhard material toward the substrate between about 5° and about 45°.

Embodiment 20: The method of any one of Embodiments 14 through 19, further comprising rendering a first center of curvature of at least a portion of a first lateral perimeter of the polycrystalline, superhard material offset from a second center of curvature of a second lateral perimeter of the substrate.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. A cutting element for an earth-boring tool, comprising:
a substrate; and
a polycrystalline, superhard material secured to an end of the substrate;
wherein a first, greatest diameter of the polycrystalline, superhard material is greater than a second, greatest diameter of the substrate, as measured in a direction at least substantially parallel to a cutting face of the polycrystalline, superhard material;
wherein the polycrystalline, superhard material extends laterally beyond a side surface of the substrate around an entire circumference of the substrate;
wherein an obtuse angle is defined between the side surface of the substrate and a surface of the polycrystalline, superhard material extending from the first, greatest diameter of the polycrystalline, superhard material toward the substrate; and
wherein a lateral perimeter of a cutting face defined by the polycrystalline, superhard material is defined by four arcuate edges intersecting at four points, wherein a radius of curvature of at least one of the arcuate edges is different from another radius of curvature of at least another of the arcuate edges.

2. The cutting element of claim 1, wherein the cutting element is configured to form a longer cutting edge per wear scar area when compared to a length of a cutting edge per wear scar area of a cutting element comprising a substrate of a first, greatest diameter and a polycrystalline, superhard material of a second, greatest diameter equal to the first, greatest diameter secured to an end of the substrate.

3. The cutting element of claim 1, wherein the first, greatest diameter is between about 105% and about 150% the second, greatest diameter.

4. The cutting element of claim 1, wherein the surface of the polycrystalline, superhard material extending from the first, greatest diameter of the polycrystalline, superhard material toward the substrate is tapered.

5. The cutting element of claim 4, wherein another surface of the polycrystalline, superhard material located between the cutting face and the tapered surface is at least substantially parallel to a side surface of the substrate extending from the polycrystalline, superhard material away from the cutting face.

6. The cutting element of claim 4, wherein the surface of the polycrystalline, superhard material extending from the first, greatest diameter of the polycrystalline, superhard material toward the substrate is curved.

7. The cutting element of claim 6, wherein the surface of the polycrystalline, superhard material extending from the first, greatest diameter of the polycrystalline, superhard material toward the substrate is convex or concave.

8. The cutting element of claim 4, wherein the angle between the side surface of the substrate and the surface of the polycrystalline, superhard material extending from the first, greatest diameter of the polycrystalline, superhard material toward the substrate is between about 5° and about 45°.

9. The cutting element of claim 1, wherein a surface of the polycrystalline, superhard material extending from the cutting face to the first, greatest diameter of the polycrystalline, superhard material is tapered.

10. The cutting element of claim 1, wherein a first center of curvature of at least a portion of the lateral perimeter of the polycrystalline, superhard material is offset from a second center of curvature of a second lateral perimeter of the substrate.

11. The cutting element of claim 10, wherein a first portion of the lateral perimeter is concentric with the second lateral perimeter and a second portion of the lateral perimeter is not concentric with the second lateral perimeter.

12. The cutting element of claim 10, wherein the first center of curvature of an entirety of the lateral perimeter of the polycrystalline, superhard material is offset from the second center of curvature of the second lateral perimeter of the substrate.

13. An earth-boring tool, comprising:
a body; and
at least one cutting element located in a corresponding pocket extending into the body, the at least one cutting element comprising:
a substrate; and
a polycrystalline, superhard material secured to an end of the substrate;
wherein a first, greatest diameter of the polycrystalline, superhard material is greater than a second, greatest diameter of the substrate, as measured in a direction at least substantially parallel to a cutting face of the polycrystalline, superhard material;
wherein the first, greatest diameter of the polycrystalline, superhard material is greater than a third, greatest diameter of the pocket, as measured in the direction at least substantially parallel to the cutting face of the polycrystalline, superhard material;
wherein the polycrystalline, superhard material extends laterally beyond a side surface of the substrate around an entire circumference of the substrate;
wherein an angle is defined between the side surface of the substrate and a surface of the polycrystalline, superhard material extending from the first, greatest diameter of the polycrystalline, superhard material toward the substrate; and
wherein a lateral perimeter of a cutting face defined by the polycrystalline, superhard material is defined by four arcuate edges intersecting at four points, wherein a radius of curvature of two of the arcuate edges is different from another radius of curvature of others of the arcuate edges.

14. A method of making a cutting element for an earth-boring tool, comprising:
securing a polycrystalline, superhard material to an end of a substrate;
rendering a first, greatest diameter of the polycrystalline, superhard material greater than a second, greatest diameter of the substrate, as measured in a direction at least substantially parallel to a cutting face of the polycrystalline, superhard material;
positioning the polycrystalline, superhard material to extend laterally beyond a side surface of the substrate around an entire circumference of the substrate;
defining are angle between the side surface of the substrate and a surface of the polycrystalline, superhard material extending from the first, greatest diameter of the polycrystalline, superhard material toward the substrate; and defining a lateral perimeter of a cutting face defined by the polycrystalline, superhard material by forming four arcuate edges intersecting at four points, wherein a radius of curvature of at least one of the arcuate edges is different from another radius of curvature of at least another of the arcuate edges.

15. The method of claim 14, wherein rendering the first, greatest diameter of the polycrystalline, superhard material greater than the second, greatest diameter of the substrate comprises removing at least a portion of the polycrystalline, superhard material, a material of the substrate, or the polycrystalline, superhard material and the material of the substrate.

16. The method of claim 14, wherein rendering the first, greatest diameter of the polycrystalline, superhard material greater than the second, greatest diameter of the substrate comprises forming the polycrystalline, superhard material with the first, greatest diameter and the substrate with the second, greatest diameter.

17. The method of claim 14, further comprising tapering a surface of the polycrystalline, superhard material from the first, greatest diameter of the polycrystalline, superhard material toward the substrate.

18. The method of claim 17, wherein tapering the surface comprises rendering the surface of the polycrystalline, superhard material extending from the first, greatest diameter of the polycrystalline, superhard material toward the substrate curved.

19. The method of claim 17, wherein tapering the surface comprises rendering the angle between the side surface of the substrate and the surface of the polycrystalline, superhard material extending from the first, greatest diameter of the polycrystalline, superhard material toward the substrate between about 5° and about 45°.

20. The method of claim 14, further comprising rendering a first center of curvature of at least a portion of the lateral perimeter of the polycrystalline, superhard material offset from a second center of curvature of a second lateral perimeter of the substrate.

* * * * *

UNITED STATES PATENT AND TRADEMARK OFFICE
CERTIFICATE OF CORRECTION

Page 1 of 1

PATENT NO. : 10,641,046 B2
APPLICATION NO. : 15/861057
DATED : May 5, 2020
INVENTOR(S) : Richard Wayne Borge It is certified that error appears in the above-identified patent and that said Letters Patent is hereby corrected as shown below:

On the Title Page
In ITEM (71) Applicant:     change "Baker Hughes, LLC," to
--Baker Hughes, a GE company, LLC,--

In the Claims
Claim 13, Column 12, Line 52, change "curvature of others" to --curvature of two others--
Claim 14, Column 12, Line 66, change "defining are angle" to --defining an angle--

Signed and Sealed this
Twenty-eighth Day of July, 2020

Andrei Iancu
*Director of the United States Patent and Trademark Office*